US010009277B2

(12) United States Patent
Goldenberg et al.

(10) Patent No.: US 10,009,277 B2
(45) Date of Patent: Jun. 26, 2018

(54) BACKWARD CONGESTION NOTIFICATION IN LAYER-3 NETWORKS

(71) Applicant: Mellanox Technologies TLV Ltd., Ra'anana (IL)

(72) Inventors: Dror Goldenberg, Zichron Yaakov (IL); Alex Shpiner, Nesher (IL); Gil Levy, Hod Hasharon (IL); Barak Gafni, Campbell, CA (US); Shachar Raindel, Haifa (IL)

(73) Assignee: Mellanox Technologies TLV Ltd., Ra'anana (IL)

( * ) Notice: Subject to any disclaimer, the term of this patent is extended or adjusted under 35 U.S.C. 154(b) by 1 day.

(21) Appl. No.: 15/225,859

(22) Filed: Aug. 2, 2016

(65) Prior Publication Data

US 2017/0041239 A1 Feb. 9, 2017

Related U.S. Application Data

(60) Provisional application No. 62/200,669, filed on Aug. 4, 2015.

(51) Int. Cl.
*H04L 12/26* (2006.01)
*H04L 12/801* (2013.01)
(Continued)

(52) U.S. Cl.
CPC .............. *H04L 47/11* (2013.01); *H04L 45/50* (2013.01); *H04L 45/72* (2013.01); *H04L 47/115* (2013.01); *H04L 47/30* (2013.01)

(58) Field of Classification Search
None
See application file for complete search history.

(56) References Cited

U.S. PATENT DOCUMENTS

| 5,400,329 A | 3/1995 | Tokura et al. |
| 5,442,624 A | 8/1995 | Bonomi et al. |

(Continued)

FOREIGN PATENT DOCUMENTS

| EP | 2068511 A1 | 6/2009 |
| WO | 2009046869 A1 | 4/2009 |
| WO | 2015123988 A1 | 8/2015 |

OTHER PUBLICATIONS

Jacquet et al., "Re-ECN: Adding Accountability for Causing Congestion to TCP/IP"—draft-briscoe-tsvwg-re-ecn-tcp-09, pp. 1-50, Oct. 25, 2010.

(Continued)

*Primary Examiner* — Otis L Thompson, Jr.
(74) *Attorney, Agent, or Firm* — D. Kligler IP Services Ltd.

(57) ABSTRACT

Communication apparatus includes a plurality of interfaces configured to be connected to a Layer-3 packet network and to serve as ingress and egress interfaces to receive and transmit packets from and to the network. Routing logic is coupled to process respective Layer-3 headers of the packets received through the ingress interfaces and to route the packets via the egress interfaces to respective destinations indicated by the Layer-3 headers. Congestion detection logic is coupled to identify a flow of the received packets that is causing congestion in the network and a Layer-3 address from which the flow originates, and to direct the routing logic to route a backward congestion notification message (CNM) packet via one of the egress interfaces to the identified Layer-3 address.

10 Claims, 4 Drawing Sheets

(51) Int. Cl.
*H04L 12/723* (2013.01)
*H04L 12/721* (2013.01)
*H04L 12/835* (2013.01)

(56) References Cited

U.S. PATENT DOCUMENTS

| | | | |
|---|---|---|---|
| 5,463,620 A | 10/1995 | Sriram | |
| 5,751,969 A | 5/1998 | Kapoor | |
| 6,081,524 A * | 6/2000 | Chase | H04L 12/2854 370/388 |
| 6,188,671 B1 | 2/2001 | Chase et al. | |
| 6,724,721 B1 | 4/2004 | Cheriton | |
| 6,741,555 B1 | 5/2004 | Li et al. | |
| 6,859,435 B1 | 2/2005 | Lee et al. | |
| 6,980,520 B1 | 12/2005 | Erimli | |
| 7,000,025 B1 | 2/2006 | Wilson | |
| 7,061,868 B1 | 6/2006 | Ahlfors et al. | |
| 7,200,116 B2 | 4/2007 | Kobayashi | |
| 7,573,827 B2 | 8/2009 | Santos et al. | |
| 7,602,712 B2 | 10/2009 | Johnsen et al. | |
| 7,706,255 B1 | 4/2010 | Kondrat et al. | |
| 7,830,889 B1 | 11/2010 | Lemaire et al. | |
| 7,839,779 B2 | 11/2010 | Singla et al. | |
| 8,174,978 B2 | 5/2012 | Naven et al. | |
| 8,201,168 B2 | 6/2012 | Haviv et al. | |
| 8,345,548 B2 | 1/2013 | Gusat et al. | |
| 8,379,515 B1 | 2/2013 | Mukerji | |
| 8,391,144 B1 | 3/2013 | Pannell et al. | |
| 8,705,349 B2 | 4/2014 | Bloch et al. | |
| 8,811,183 B1 | 8/2014 | Anand et al. | |
| 8,867,356 B2 | 10/2014 | Bloch et al. | |
| 9,660,914 B1 * | 5/2017 | Zhou | H04L 47/12 |
| 2003/0026267 A1 | 2/2003 | Oberman et al. | |
| 2004/0202169 A1 | 10/2004 | Mukouyama et al. | |
| 2005/0105466 A1 * | 5/2005 | Chase | H04L 12/4608 370/230 |
| 2006/0045089 A1 | 3/2006 | Bacher et al. | |
| 2006/0088036 A1 | 4/2006 | De Prezzo | |
| 2006/0156164 A1 | 7/2006 | Meyer et al. | |
| 2008/0056125 A1 | 3/2008 | Kneckt et al. | |
| 2008/0075003 A1 | 3/2008 | Lee et al. | |
| 2008/0232251 A1 | 9/2008 | Hirayama et al. | |
| 2008/0304413 A1 | 12/2008 | Briscoe et al. | |
| 2009/0052326 A1 * | 2/2009 | Bergamasco | H04L 47/10 370/236 |
| 2009/0086637 A1 | 4/2009 | Decusatis et al. | |
| 2009/0178037 A1 | 7/2009 | Winter et al. | |
| 2009/0268614 A1 * | 10/2009 | Tay | H04L 47/10 370/236 |
| 2010/0027420 A1 | 2/2010 | Smith | |
| 2010/0088437 A1 | 4/2010 | Zahavi | |
| 2010/0098072 A1 * | 4/2010 | Satterlee | H04L 45/04 370/389 |
| 2011/0032819 A1 | 2/2011 | Schliwa-Bertling et al. | |
| 2011/0242973 A1 | 10/2011 | Ge et al. | |
| 2012/0051216 A1 | 3/2012 | Zhang et al. | |
| 2012/0155276 A1 | 6/2012 | Vasseur et al. | |
| 2012/0195200 A1 | 8/2012 | Regan | |
| 2013/0003538 A1 | 1/2013 | Greenberg et al. | |
| 2013/0124753 A1 * | 5/2013 | Ansari | H04L 47/263 709/235 |
| 2013/0289926 A1 | 10/2013 | Maity et al. | |
| 2014/0064082 A1 | 3/2014 | Yeung et al. | |
| 2014/0185616 A1 | 7/2014 | Bloch et al. | |
| 2014/0269301 A1 | 9/2014 | Rungta et al. | |
| 2014/0269321 A1 | 9/2014 | Kamble et al. | |
| 2015/0009817 A1 | 1/2015 | Sato | |
| 2015/0029853 A1 | 1/2015 | Raindel et al. | |
| 2015/0055478 A1 | 2/2015 | Tabatabaee et al. | |
| 2015/0103667 A1 | 4/2015 | Elias et al. | |
| 2015/0172169 A1 | 6/2015 | DeCusatis et al. | |
| 2015/0372918 A1 | 12/2015 | Zhou et al. | |
| 2016/0014029 A1 | 1/2016 | Yuan et al. | |

OTHER PUBLICATIONS

Jiang et al., "Forward Explicit Congestion Forward Explicit Congestion Notification (FECN) for Notification (FECN) for Datacenter Ethernet Networks", IEEE 802.1au Congestion Notification Group Interim Meeting, 60 pages, Mar. 12-15, 2007.
U.S. Appl. No. 14/338,488 Office Action dated Apr. 20, 2016.
U.S. Appl. No. 14/052,743 Office Action dated Mar. 24, 2016.
U.S. Appl. No. 14/052,743 Office Action dated Aug. 8, 2016.
U.S. Appl. No. 14/730,257 Office Action dated Sep. 20, 2016.
IEEE Standard 802.1Qau for Local and metropolitan area networks—"Virtual Bridged Local Area Networks", Amendment 13: Congestion Notification, pp. 1-135, Apr. 23, 2010.
Infiniband Trade Association, "Infiniband Architecture Specification", vol. 1, release 1.2.1, Annex A10, pp. 1650-1697, Nov. 2007.
IEEE, 802.3, "Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications Corrigendum 1: Timing Considerations for PAUSE Operation, 12 pages, Jan. 2009.
Mahalingam et al, "VXLAN: A Framework for Overlaying Virtualized Layer 2 Networks over Layer 3 Networks", draft-mahalingam-dutt-dcops-vxlan-02.txt, Network Working Group, Internet Draft, 20 pages, Aug. 22, 2012.
U.S. Appl. No. 13/304,654 Office Action dated Nov. 6, 2013.
U.S. Appl. No. 13/304,654 Office Action dated Aug. 2, 2013.
Zahavi et al., "On the Relation Between Congestion Control, Switch Arbitration and Fairness," 11th IEEE/ACM International Symposium on Cluster, Cloud and Grid Computing (CCGrid), pp. 23-26, May 2011.
IEEE Standard 802.1Qbb for Local and metropolitan area networks—"Media Access Control (MAC) Bridges and Virtual Bridged Local Area Networks", Amendment 17: Priority-based Flow Control, pp. 1-40, Sep. 30, 2011.
U.S. Appl. No. 13/245,886 Office Action dated Sep. 30, 2013.
IEEE Standard 802.3 for Information technology—"Telecommunications and information exchange between systems", Local and metropolitan area networks, pp. 1-628, Dec. 9, 2005.
U.S. Appl. No. 13/245,886 Office Action dated May 22, 2013.
Chu et al, "Transmission of IP over InfiniBand (IPoIB)", Network Working Group, RFC 4391, 21 pages, Apr. 2006.
Allman et al, "TCP Congestion Control", Network Working Group, RFC 2581, 14 pages, Apr. 1999.
Ramakrishnan et al, "The Addition of Explicit Congestion Notification (ECN) to IP", Network Working Group, RFC 3168, 63 pages, Sep. 2001.
Sridharan et al, "NVGRE: Network Virtualization using Generic Routing Encapsulation", draft-sridharan-virtualization-nvgre-01.1xt, Network Working Group, Internet Draft, 17 pages, Jul. 9, 2012.
U.S. Appl. No. 14/052,743 Office Action dated Sep. 29, 2015.
Allman et al., "TCP Congestion Control", Request for Comments (RFC) 5681 of the Internet Engineering Task Force (IETF), 18 pages, Sep. 2009.
U.S. Appl. No. 14/052,743 Office Action dated May 21, 2015.
U.S. Appl. No. 14/052,743 Office Action dated Jan. 12, 2017.
U.S. Appl. No. 15/278,143 Office Action dated Mar. 28, 2018.

\* cited by examiner

BACKWARD CONGESTION NOTIFICATION IN LAYER-3 NETWORKS

CROSS-REFERENCE TO RELATED APPLICATION

This application claims the benefit of U.S. Provisional Patent Application 62/200,669, filed Aug. 4, 2015, which is incorporated herein by reference.

FIELD OF THE INVENTION

The present invention relates generally to packet communication networks, and particularly to methods and systems for control of congestion in such networks.

BACKGROUND

Current high-performance applications inject increasingly unpredictable, bursty traffic into data center networks, causing network congestion and degrading their own and other applications' performance. Congestion control protocols have been developed to alleviate these problems. These protocols inform traffic sources about the congestion in the network. Using this information, the traffic sources reduce the injection rate of their traffic. When congestion is not indicated, the traffic sources continually attempt to increase their traffic injection rates. The performance of the congestion control mechanism depends on several factors, such as notification delay and accuracy of notification.

Congestion control protocols for large-scale data centers are based mainly on forward explicit congestion notification (FECN), meaning that a congestion notification message (CNM) is propagated first from the detection point to the destination and is then reflected back from the destination to the traffic source. When the source of the traffic receives the CNM, it lowers the injection rate of the corresponding traffic flow. (A "flow" is a sequence of packets transmitted through the network from a particular source to a particular destination.) Typically, congested switches send congestion notifications to the destinations of packets that they forward by setting a specific FECN bit in the packet headers.

Direct backward explicit congestion notification (BECN) is currently used generally only by bridges in smaller, Layer-2 networks. IN BECN, the congestion notification is returned directly from the congested switch to the traffic source. BECN for Ethernet networks is defined in the IEEE 802.1Q-2011 standard, which defines a CNM that is directed from the congested bridge to the origin of the congesting flow. The CNM can include quantized feedback (QCN—quantized congestion notification) that is indicative of the severity of congestion.

A number of attempts to extend QCN to Layer-3 networks have been described in the patent literature. For example, U.S. Patent Application Publication 2015/0372918 describes a method for sending congestion notification messages through L3 (Layer-3) networks. As described in this publication, a data packet is received at a first switch in a first fabric block of an L3 network, and the first switch performs source MAC tagging of the data packet. The data packet is then forwarded to a second switch in a second fabric block of the L3 network, and the source MAC tag is maintained by the second switch and any intermediate switches. The second switch determines, in response to receiving the data packet, whether it is congested, and generates a notification message if it is congested. The notification message is L2 forwarded to the first fabric block, and further forwarded from the first switch to a source of the data packet using ACL matching.

As another example, Chinese Patent Application Publication CN 104852855 describes a congestion control method that comprises the steps of: obtaining a first message from a receiving cache of exchange equipment when the exchange equipment is detected to be congested; obtaining a source IP address of the first message when a source MAC address of the first message is the MAC address of gateway equipment; generating a first congestion control message according to the source IP address of the first message when the source IP address is not the IP address of the gateway equipment; and sending the first congestion message to the gateway equipment. According to the invention, congestion control over a three-layer SAN is realized, and the three-layer SAN is protected against packet loss, non-preserved order of messages, or the like.

SUMMARY

Embodiments of the present invention that are described hereinbelow provide improved methods and apparatus for congestion control in Layer-3 networks, such as Internet Protocol (IP) networks.

There is therefore provided, in accordance with an embodiment of the invention, communication apparatus, including a plurality of interfaces configured to be connected to a Layer-3 packet network and to serve as ingress and egress interfaces to receive and transmit packets from and to the network. Routing logic is coupled to process respective Layer-3 headers of the packets received through the ingress interfaces and to route the packets via the egress interfaces to respective destinations indicated by the Layer-3 headers. Congestion detection logic is coupled to identify a flow of the received packets that is causing congestion in the network and a Layer-3 address from which the flow originates, and to direct the routing logic to route a backward congestion notification message (CNM) packet via one of the egress interfaces to the identified Layer-3 address.

In a disclosed embodiment, the CNM packet includes a quantized congestion notification. Typically, the apparatus includes a memory containing multiple queues holding the packets awaiting transmission through the egress interfaces, wherein the congestion detection logic is configured to detect the congestion responsively to a state of the queues.

In some embodiments, the congestion detection logic is configured to identify the Layer-3 address by extracting a Layer-3 source address from headers of the packets in the identified flow, and to cause the routing logic to insert the extracted Layer-3 source address as a Layer-3 destination address in a header of the CNM packet. In a disclosed embodiment, the header of the CNM packet contains a field identifying the CNM packet as a congestion notification, and the congestion detection logic is configured to insert contents of specified fields from the headers of the packets in the identified flow into a payload of the CNM packet. When the Layer-3 destination address belongs to an anycast router, the anycast router receiving the CNM packet is able to identify a node from which the identified flow originates and to forward the CNM packet to the identified node.

In one embodiment, the Layer-3 headers of the packets transmitted through the network contain a field that is assigned a specified value to indicate that a source of the packets is capable of handling backward CNM packets, and the congestion detection logic is configured, when the field has the specified value in the packets in the identified flow, to direct the routing logic to route the backward CNM packet to the identified Layer-3 address from which the identified flow originates, and otherwise to transmit a forward explicit congestion notification (FECN) to a destination of the identified flow.

In another embodiment, the routing logic is configured to serve as a label edge router (LER) at an egress from a label-switched tunnel through the network, and the congestion detection logic is configured to identify the flow causing the congestion in response to a forward explicit congestion notification (FECN) received from a label-switched router (LSR) in the tunnel, and to direct the routing logic to route the backward CNM packet to the identified Layer-3 address from which the identified flow originates via a path that is independent of the tunnel.

There is also provided, in accordance with an embodiment of the invention, a method for communication, which includes receiving packets in multiple flows from a Layer-3 packet network through ingress interfaces connected to the Layer-3 packet network. Respective Layer-3 headers of the packets received through the ingress interfaces are processed and routed via egress interfaces to respective destinations indicated by the Layer-3 headers. A flow of the received packets that is causing congestion in the network and a Layer-3 address from which the flow originates are identified. A backward congestion notification message (CNM) packet is routed via one of the egress interfaces to the identified Layer-3 address.

The present invention will be more fully understood from the following detailed description of the embodiments thereof, taken together with the drawings in which:

DETAILED DESCRIPTION OF EMBODIMENTS

Overview

Large-scale, high-performance data centers are subject to unpredictable, bursty traffic. Rapid response to the resulting congestion, as is offered by BECN (and particularly QCN) techniques, is important in mitigating congestion with precision, as it occurs.

Existing BECN protocols were designed to operate in Layer-2 networks, such as Ethernet networks defined by the above-mentioned 802.1Q standard, using media access control (MAC) addressing and forwarding. Layer-2 addressing, however, is inadequate for the needs of growing data centers, which are increasingly moving over to Layer-3 addressing and routing, using the Internet Protocol (IP), for example. Layer-3 routing presents challenges that cannot be met by existing BECN protocols, and Layer-3 networks are generally limited at present to less efficient FECN-based congestion control techniques.

Embodiments of the present invention that are described herein provide more efficient techniques for congestion control in Layer-3 networks, as well as apparatus implementing such techniques. These embodiments use a novel BECN protocol that is suitable for Layer-3 networks and thus improves the speed and accuracy of notification to the congestion source. The disclosed protocol relies only on Layer-3 addressing and routing and is not dependent on MAC-layer addresses and functionality (although it can interoperate with Layer-2 elements, such as MAC-layer bridges). The embodiments that are described hereinbelow relate specifically to IP networks, but the principles of the present invention are similarly applicable, mutatis mutandis, to other sorts of Layer-3 networks in which congestion control is required.

The disclosed embodiments are typically implemented in communication apparatus, such as a Layer-3 router, which has interfaces that serve as ingress and egress interfaces to receive and transmit packets from and to a Layer-3 network. Routing logic in the apparatus processes the Layer-3 headers of the packets received through the ingress interfaces and thus routes the packets via the egress interfaces to respective destinations, as is known in the art.

At the same time, congestion detection logic in the apparatus identifies flows causing congestion in the network and the respective Layer-3 addresses from which such flows originate. Upon identifying such a congesting flow, the congestion detection logic directs the routing logic to route a backward CNM packet via one of the egress interfaces to the identified Layer-3 address. Since the CNM packet has a Layer-3 header (in contrast to packets generated by existing BECN techniques), it will be forwarded by the routers in the network directly back to the source of the congestion, thus avoiding the delays that are incurred by FECN protocols that are known in the art.

Typically, the apparatus comprises a memory containing multiple queues, which hold the packets awaiting transmission through the egress interfaces. The congestion detection logic is configured to detect the congestion responsively to a state of the queues and to generate the CNM packet accordingly. Based on the queue states, the CNM packet may comprise a quantized congestion notification (QCN).

In the disclosed embodiments, the congestion detection logic identifies the Layer-3 address from which a congesting flow originates, for example, by extracting a Layer-3 source address from headers of the packets in the identified flow. The congestion detection logic causes the routing logic to insert the extracted Layer-3 source address as the Layer-3 destination address in the CNM packet header. This header may also contain a field identifying the CNM packet as a congestion notification. As described in greater detail hereinbelow, these features can be adapted not only to handle ordinary unicast Layer-3 flows, but also for more complex cases such as anycast and tunneled Layer-3 traffic.

System Description

Figure 1:
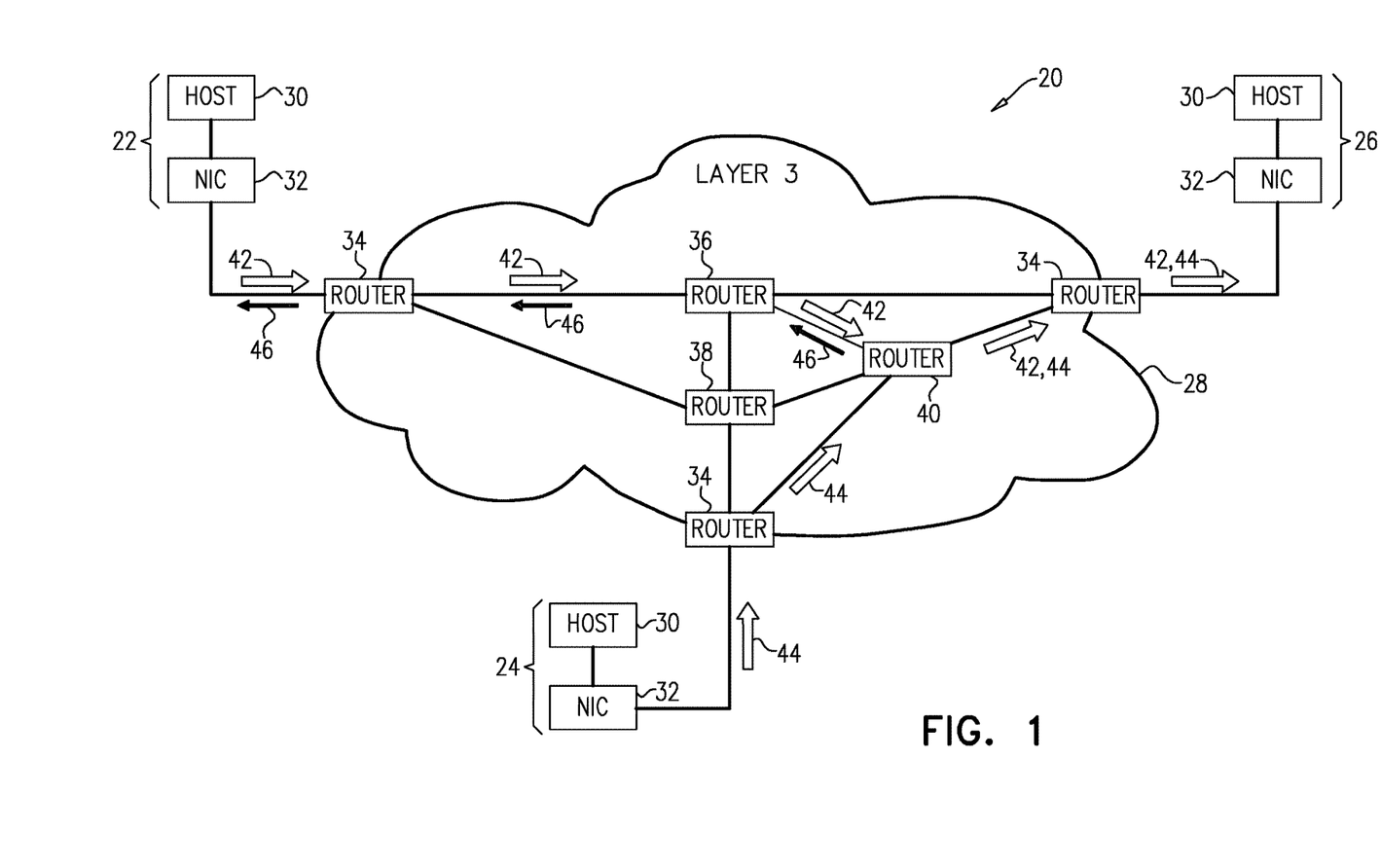
FIG. 1 is block diagram that schematically illustrates a packet communication system with Layer-3 congestion control, in accordance with an embodiment of the invention.

FIG. 1 is block diagram that schematically illustrates a packet communication system 20 with Layer-3 congestion control, in accordance with an embodiment of the invention. System 20 comprises multiple computers 22, 24, 26, . . . , which are interconnected by a Layer-3 network 28, such as an IP network. Each computer 22, 24, 26, . . . , comprises a host processor 30 and a network interface controller (NIC) 32, which connects the computer to network 28 via an edge router 34. Packet traffic is forwarded between edge routers 34, based on fields in the Layer-3 packet headers (such as the destination IP address), via core routers 36, 38, 40, . . . . More generally speaking, system 20 may also comprise Layer-2 elements, such as bridges, but these elements are omitted here for the sake of simplicity.

In the pictured scenario, computers 22 and 24 inject respective traffic flows 42 and 44 into network 28. The packets in these flows carry source IP addresses identifying computers 22 and 24, respectively, and in the present example, are directed to a destination IP address of computer 26. Based on the destination IP addresses, both of flows 42 and 44 are forwarded through network 28 via router 40, which encounters congestion on the egress interface through which the flows are directed to computer 26 via edge router 34.

Router 40 determines that the cause of the congestion is heavy traffic in flow 42 and accordingly generates a backward CNM packet 46. By examining the IP headers of the packets in flow 42, router 40 derives a destination IP address to use in packet 46. As noted earlier, packet 46 may contain a QCN, as well as a header field marking packet 46 as a BECN and a payload containing all or a part of the IP and/or transport layer header of the packets in flow 42. Based on the destination IP address in packet 46, routers 36 and 34 forward packet 46 to NIC 32 of computer 22.

Upon receiving CNM packet 46, computer 22 takes immediate action to reduce the rate of transmission of flow 42. For example, communication software running on host processor 30 (such as the TCP/IP processing stack or the NIC driver) may reduce the rate at which the host processor passes packets in flow 42 to NIC 32 for transmission. Additionally or alternatively, NIC 32 may apply shaping logic selectively to flow 42 in order to limit the rate at which it releases packet in the flow to network 28. In either case, after temporarily reducing the flow rate in this manner, computer 22 attempts gradually to return to full-rate transmission of flow 42.

Figure 2:
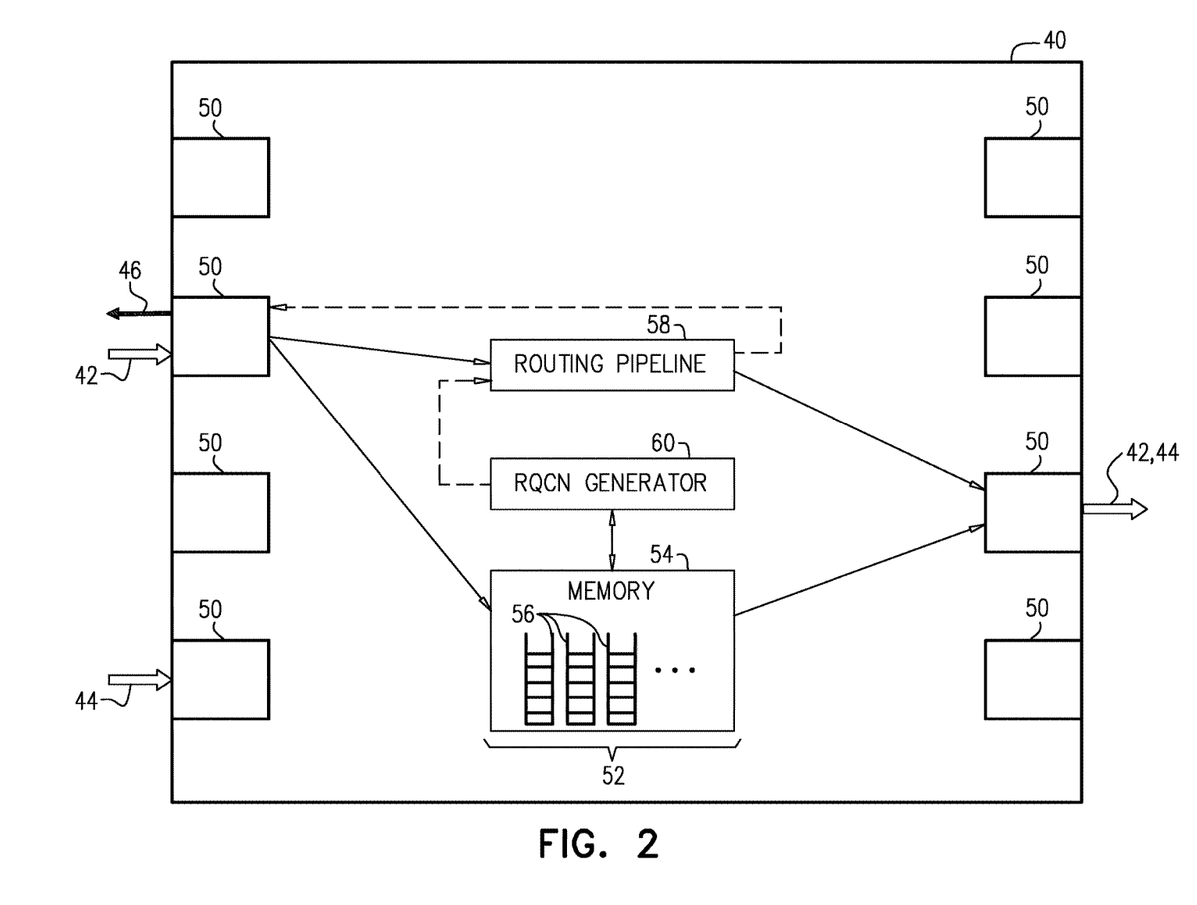
FIG. 2 is a block diagram that schematically illustrates a packet router with congestion control capabilities, in accordance with an embodiment of the invention.

FIG. 2 is a block diagram that schematically shows details of router 40, in accordance with an embodiment of the invention. The details shown in FIG. 2 relate particularly to implementation of BECN in the router, and other features, which will be apparent to those skilled in the art, have been omitted for the sake of simplicity. Although router 40 is chosen here by way of illustration, the other routers in network 28 will typically have similar features.

Router 40 comprises multiple interfaces 50, such as network ports, which are configured to be connected to network 28. Although two of these interfaces are pictured as ingress ports in the example shown in FIG. 2, and another serves as the egress port, in general all of interfaces 50 are capable of serving as ingress and egress interfaces to receive and transmit packets from and to the network. Interfaces 50 connect internally to a router core 52, which buffers and forwards the packets among the interfaces.

Core 52 comprises a memory 54, containing multiple queues 56 holding the packets awaiting transmission through egress interfaces 50. In the pictured embodiment, for the sake of simplicity, memory 54 is shown as a single centralized block, but at least a part of the memory that holds queues 56 may be distributed among interfaces 50, for example. Routing logic, shown as a routing pipeline 58, processes the Layer-3 headers of the packets received through the ingress interfaces and places the packets in queues 56 corresponding to the appropriate egress interfaces for routing to the destinations indicated by the Layer-3 headers. Typically, as part of the forwarding process, routing pipeline 58 performs ancillary functions that are known in the art, such as MAC address resolution (using the Address Resolution Protocol—ARP), setting the time-to-live (TTL) field in the packet headers, setting priority (using the Differentiated Services Code Point—DSCP—value in the IP header), calculating checksums, enforcing an access control list (ACL), and so forth.

Router 40 also comprises congestion detection logic, shown in FIG. 2 as a routed quantized congestion notification (RQCN) generator 60. RQCN generator 60 monitors the state of queues 56 in order to detect congestion conditions. When congestion occurs, the RQCN generator inspects the packet headers in order to identify the flow or flows responsible for the congestion, for example by extracting the 5-tuple including the source and destination IP addresses and ports and the transport protocol. For ordinary IP unicast traffic, the source IP address of the flow is the IP address from which the flow originates, and RQCN generator 60 will direct a CNM packet to this IP address. For other traffic types (such as anycast and tunneled traffic), the RQCN generator may need to perform additional processing in order to identify the appropriate destination IP address for the CNM packet, as described further hereinbelow. Based on the states of queues 56, RQCN generator 60 also generates a quantized value, which is indicative of the severity of congestion, in a manner similar to that specified by the above-mentioned 802.1Q standard.

RQCN generator 60 directs routing pipeline 58 to route a backward CNM packet via the appropriate egress interface 50 of router 40 to the destination IP address that the RQCN generator identified as the source of the congesting flow. Routing pipeline 58 thus applies the same ancillary functions (such as ARP, setting TTL, setting DSCP, and calculating checksums) to the CNM packet as it does to ordinary data traffic, although certain functions (such as ACL and rate shaping) can be skipped for CNM packets. Typically, RQCN generator 60 instructs routing pipeline 58 to apply a high-priority DSCP value to the CNM packet, in order to ensure that the packet reaches the congestion source with minimal latency. In one embodiment, a unique DSCP value (selected in advance from among the sixty-four different possible values of the six-bit DSCP field in the IP header) is assigned for use in backward CNM packets 46. This marking enables both routers 34, 36, . . . , along the path of packets 46 and destination computer 22 (FIG. 1) to immediately recognize the backward CNM packet as such, and thus give the CNM packet high priority in both forwarding and processing.

Alternatively or additionally, other fields of the packet header may be used to identify the backward CNM packet to routers and computers in system 20. For example, when routing pipeline 58 is configured to transmit backward CNM packets over Transmission Control Protocol (TCP) connections, RQCN generator 60 may instruct the routing pipeline to insert a predefined value in the "TCP options" field of the TCP header to identify the packet as a CNM packet. Alternatively, the backward CNM packet may be identified by inserting a specified value in the Protocol field of the IP header or a specified setting of reserved bits in the generic routing encapsulation (GRE) header.

In some embodiments, RQCN generator 60 inserts data in the payload of the backward CNM packet to assist computer 22, and possibly other network elements, such as routers or gateways, in identifying the flow to which the CNM is directed, and thus to apply the desired congestion control operations to this flow. For example, the RQCN generator may extract the Layer-3 and Layer-4 headers of a packet in the congesting flow and insert them in the payload of the backward CNM packet. Additionally or alternatively, backward CNM packet 46 may include other data specified by the 802.1Q standard, with appropriate modifications for use in a Layer-3 network.

Handling of Anycast Traffic

Figure 3:
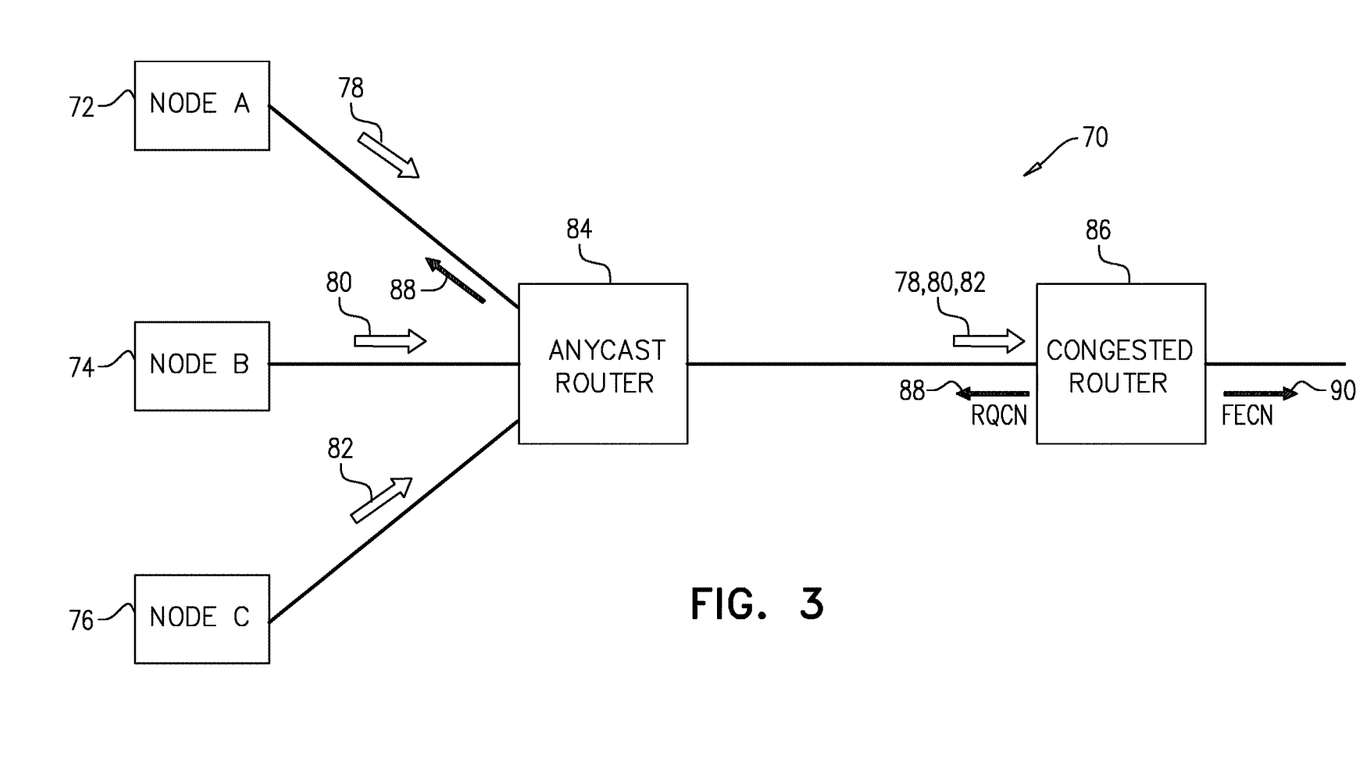
FIG. 3 is a block diagram that schematically illustrates a packet communication system with Layer-3 congestion control, in accordance with another embodiment of the invention.

FIG. 3 is a block diagram that schematically illustrates a packet communication system 70 with Layer-3 congestion control, in accordance with another embodiment of the invention. This embodiment relates specifically to handling of backward CNM packets in a Layer-3 network that supports anycast transmission. Although system 70 is shown, for the sake of simplicity, in isolation from other network elements, in practice, the techniques that are described herein for handling of congestion due to anycast transmissions can be integrated with handling of unicast congestion, as described above and illustrated in the preceding figures. The techniques described hereinbelow with respect to anycast configurations can similarly be applied, mutatis mutandis, in solving problems associated with sending backward CNM packets through network address translation (NAT) gateways.

In the scenario illustrated in FIG. 3, multiple nodes 72, 74, 76 inject respective flows 78, 80, 82 into a network, such as network 28 (FIG. 1), via an anycast router 84. (Nodes 72, 74 and 76 are labeled as NODE A, NODE B and NODE C, respectively, and may comprise, for example, servers or other sorts of computers.) A router 86 downstream from anycast router 84 encounters congestion, which is attributable to flow 78. In response to this congestion, router 86 transmits a backward CNM packet 88 (referred to, as above, as an RQCN packet) identifying the source of the congestion.

In contrast to the unicast flows described earlier, network anycast addressing introduces a problem in forwarding backward CNM packet 88 to its appropriate destination, since all of flows 78, 80 and 82 can have the same source IP address, which belongs to anycast router 84. In general, only a subset of one or more of these flows is actually responsible for the congestion, and router 84 should forward CNM packet 88 only to the node or nodes from which the congesting flow or flows originate. Anycast router 84 will generally be unable to decide based solely on the destination IP address of CNM packet 88, however, to which of nodes 72, 74 and 76 the packet should be forwarded. Furthermore, when CNM packet 88 reaches router 84 on the backward path of the data flow, it may have field values (such as the protocol type) in the 5-tuple of its header that are different from those of flow 78, and it may have no transport header at all. Therefore, hash-based forwarding schemes that are known in the art may also fail to deliver the CNM packet from router 84 to the node that is responsible for the congestion.

To handle these sorts of cases, in one embodiment of the present invention, RQCN generator 60 instructs routing pipeline 58 to set the destination IP address of backward CNM packet 88 to be the IP address of anycast router 84, while setting one or more of the header field values to identify the packet as a backward CNM packet. For example, as described above, RQCN generator 60 may instruct the routing pipeline to insert an assigned value in the "TCP options" field of backward CNM packet 88, while inserting the contents of the IP and transport-layer headers of the packets in congesting flow 78 into the payload of this CNM packet. Upon receiving this CNM packet, anycast router 84 is thus able to invoke a dedicated CNM forwarding procedure, based on the header information that is encapsulated in the CNM packet payload, which enables router 84 to identify node 78 from which the identified flow originates and to forward the CNM packet to this node.

In some networks, not all routers will necessarily be configured to handle backward CNM packets 88 of this sort, any anycast routers in particular, such as router 84, may not always have the additional information or processing capability that is needed in order to forward backward CNM packets 88 to the source of congestion. In such cases, it is desirable that congested routers that are BECN-capable (such as router 86 in FIG. 3) be able to default to standard FECN with respect to flows for which BECN is not supported by the upstream router (such as router 84). This sort of BECN-capability signaling can be used not only in the context of anycast routing, but also more generally by other elements in a Layer-3 network.

For this purpose, in some embodiments of the present invention, router 84 sets a certain field in the Layer-3 headers of the packets that it transmits, such as the packets in flows 78, 80 and 82, to indicate whether the source of the packets is capable of handling backward CNM packets. RQCN generator 60 in router 86 checks the value of this field in the packets in the congesting flow in order to decide what sort of congestion notification to use: When the field has a value indicating that backward CNM is supported for this flow, RQCN generator 60 will direct routing pipeline 58 to route backward CNM packet 88 to the IP address from which congesting flow 78 originates, i.e., the IP address of anycast router 84 in the present example. Otherwise, RQCN generator 60 will direct routing pipeline 58 to transmit an FECN packet 90 to the destination of congesting flow 78, and the destination node will then return a CNM to node 72 in the conventional manner.

Various fields and marking schemes can be used by anycast router 84 (as well as by host computers and other elements in the network) to indicate whether backward CNM is supported for a given flow. For example, a certain value or values of the DSCP field in a given flow can be defined as indicating that the source of the flow supports backward CNM, while other DSCP values indicate that only FECN can be used with this flow. As another example, the existing two-bit ECN field in the IP header may be defined so that the value 01 indicates that the source of the flow supports backward CNM, while the value 10 indicates that only FECN is supported, or vice versa. (At present, there is a redundancy in the standard ECN protocol, in that both 01 and 10 signal ECN eligibility.)

Additionally or alternatively, the TCP options header field may contain a value that identifies packet 88 as a backward CNM packet, as noted above.

In any case, anycast router 84 identifies backward CNM packet 88 based on the appropriate, predefined values of the designated header field or field. Router 84 then uses the payload of the backward CNM packet, possibly in combination with certain header fields, in identifying the actual node 72 from which the congesting flow 78 originates, and is thus able to forward backward CNM packet 88 to the correct destination.

Handling Tunneled Network Traffic

Figure 4:
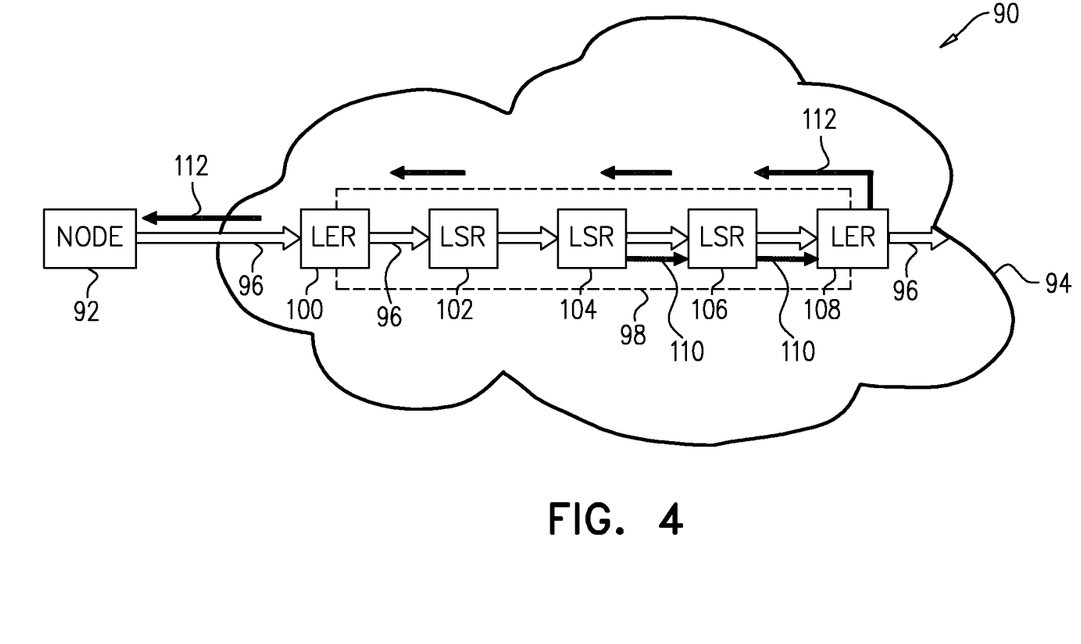
FIG. 4 is a block diagram that schematically illustrates a packet communication system with Layer-3 label-switched routing and congestion control, in accordance with an embodiment of the invention.

FIG. 4 is a block diagram that schematically illustrates a packet communication system 90 with Layer-3 label-switched routing and congestion control, in accordance with another embodiment of the invention. This embodiment relates specifically to issues associated with congestion arising in tunneled network traffic, such as traffic that is transmitted over label-switched paths in accordance with the Multiprotocol Label Switching (MPLS) protocol. Because MPLS paths (referred to as "tunnels") are unidirectional, when an MPLS label-switched router (LSR) encounters congestion and identifies a congesting flow, the LSR cannot return a backward CNM message through the tunnel to the source of the flow. Similar problems are encountered in other sorts of tunneling protocols that are known in the art.

In the example shown in FIG. 4, a node 92, such as a computer, transmits a flow 96 of data packets to an IP network 94, and this flow is routed through the network via a tunnel 98, such as an MPLS label-switched path. A label edge router (LER) 100 pushes a label stack onto the packets at the ingress to tunnel 98, in accordance with MPLS conventions. LSRs 102, 104, 106, . . . , along tunnel 98 pop labels from the stack in order to identify the next router on the path and forward the packets in flow 96 accordingly. Routing logic (such as routing pipeline 58) in an LER 108 at the egress from tunnel 98 removes the remaining label stack and forwards the packets in flow 96 to their destination, as indicated by the destination address in the underlying IP header of the packets.

In the pictured scenario, LSR 104 experiences congestion, and congestion detection logic in LSR 104 identifies flow 96 as the cause of the congestion. Because LSR 104 cannot readily identify the source of flow 96, however, it forwards a FECN packet 110 through tunnel 98, along the same path as flow 96. LSR 104 applies the same label stack to FECN packet 110 as it does to flow 96, while setting one or more specified bits in the header of packet 110 to indicate that it is a CNM. (The bits set in the FECN packet header also typically indicate that packet 110 should be transmitted with higher priority than ordinary data traffic.) LSR 104 inserts into the payload of FECN packet 110 information that can be used to identify flow 96, such as the header of a packet from flow 96, up to and including at least the IP header underlying the label stack.

FECN packet 110 is forwarded through tunnel 98 via the subsequent LSRs, such as LSR 106, to LER 108. Routing pipeline 58 in LER 108 recognizes packet 110 as a CNM and passes it to RQCN generator 60 (FIG. 2), which processes the payload of the packet in order to identify flow 96 as the flow causing the congestion in tunnel 98. RQCN generator 60 also ascertains that the source of the congesting flow is node 92, based on the IP header encapsulated in packet 110. On this basis, the RQCN generator directs routing pipeline 58 to route a backward CNM packet 112 to the IP address from which flow 96 originated. This backward CNM packet is typically forwarded through network 94 to node 92 by ordinary IP routing, via a path that is independent of tunnel 98.

As noted earlier, although the embodiments described above relate specifically to IP networks, the principles of these embodiments may readily be extended, mutatis mutandis, to other sorts of Layer-3 networks. Furthermore, in networks that integrate Layer-3 routers with Layer-2 elements, such as bridges, the techniques described above may readily be extended to interoperate with the Layer-2 elements by removal of the Layer-3 headers from the CNM packets. Such extensions of the present techniques are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a plurality of interfaces configured to be connected to a Layer-3 packet network and to serve as ingress and egress interfaces to receive and transmit packets from and to the network;
routing logic, which is coupled to process respective Layer-3 headers of the packets received through the ingress interfaces and to route the packets via the egress interfaces to respective destinations indicated by the Layer-3 headers; and
congestion detection logic, which is coupled to identify a flow of the received packets that is causing congestion in the network and a Layer-3 address from which the flow originates, and to direct the routing logic to route a backward congestion notification message (CNM) packet via one of the egress interfaces to the identified Layer-3 address,
wherein the congestion detection logic is configured to identify the Layer-3 address by extracting a Layer-3 source address from headers of the packets in the identified flow, and to cause the routing logic to insert the extracted Layer-3 source address as a Layer-3 destination address in a header of the CNM packet, and
wherein the header of the CNM packet contains a field identifying the CNM packet as a congestion notification, and wherein the congestion detection logic is configured to insert contents of specified fields from the headers of the packets in the identified flow into a payload of the CNM packet,
whereby when the Layer-3 destination address belongs to an anycast router, the anycast router receiving the CNM packet is able to identify a node from which the identified flow originates and to forward the CNM packet to the identified node.

2. The apparatus according to claim 1, wherein the CNM packet comprises a quantized congestion notification.

3. The apparatus according to claim 1, and comprising a memory containing multiple queues holding the packets awaiting transmission through the egress interfaces, wherein the congestion detection logic is configured to detect the congestion responsively to a state of the queues.

4. The apparatus according to claim 1, wherein the Layer-3 headers of the packets transmitted through the network contain a field that is assigned a specified value to indicate that a source of the packets is capable of handling backward CNM packets, and
wherein the congestion detection logic is configured, when the field has the specified value in the packets in the identified flow, to direct the routing logic to route the backward CNM packet to the identified Layer-3 address from which the identified flow originates, and otherwise to transmit a forward explicit congestion notification (FECN) to a destination of the identified flow.

5. Communication apparatus, comprising:
a plurality of interfaces configured to be connected to a Layer-3 packet network and to serve as ingress and egress interfaces to receive and transmit packets from and to the network;
routing logic, which is coupled to process respective Layer-3 headers of the packets received through the ingress interfaces and to route the packets via the egress interfaces to respective destinations indicated by the Layer-3 headers;

congestion detection logic, which is coupled to identify a flow of the received packets that is causing congestion in the network and a Layer-3 address from which the flow originates, and to direct the routing logic to route a backward congestion notification message (CNM) packet via one of the egress interfaces to the identified Layer-3 address, wherein the routing logic is configured to serve as a label edge router (LER) at an egress from a label-switched tunnel through the network, and wherein the congestion detection logic is configured to identify the flow causing the congestion in response to a forward explicit congestion notification (FECN) received from a label-switched router (LSR) in the tunnel, and to direct the routing logic to route the backward CNM packet to the identified Layer-3 address from which the identified flow originates via a path that is independent of the tunnel.

6. A method for communication, comprising:

receiving packets in multiple flows from a Layer-3 packet network through ingress interfaces connected to the Layer-3 packet network;

processing respective Layer-3 headers of the packets received through the ingress interfaces and routing the packets via egress interfaces to respective destinations indicated by the Layer-3 headers;

identifying a flow of the received packets that is causing congestion in the network and a Layer-3 address from which the flow originates; and routing a backward congestion notification message (CNM) packet via one of the egress interfaces to the identified Layer-3 address wherein identifying the Layer-3 address comprises extracting a Layer-3 source address from headers of the packets in the identified flow, and wherein routing the backward CNM packet comprises inserting the extracted Layer-source address as a Layer-3 destination address in a header of the CNM packet, and wherein routing the backward CNM packet comprises inserting in the header of the CNM packet a field identifying the CNM packet as a congestion notification, and inserting contents of specified fields from the headers of the packets in the identified flow into a payload of the CNM packet, whereby when the Layer-3 destination address belongs to an anycast router, the anycast router receiving the CNM packet is able to identify a node from which the identified flow originates and to forward the CNM packet to the identified node.

7. The method according to claim 6, wherein routing the backward CNM packet comprises computing and transmitting a quantized congestion notification.

8. The method according to claim 6, wherein identifying the flow comprises detecting the congestion responsively to a state of multiple queues holding the packets awaiting transmission through the egress interfaces.

9. The method according to claim 6, and comprising setting a field in the Layer-3 headers of the packets transmitted through the network to a specified value to indicate that a source of the packets is capable of handling backward CNM packets, and wherein routing the backward CNM packet comprises route the backward CNM packet to the identified Layer-3 address from which the identified flow originates when the field has the specified value in the packets in the identified flow, and otherwise transmitting a forward explicit congestion notification (FECN) to a destination of the identified flow.

10. A method for communication, comprising:

receiving packets in multiple flows from a Layer-3 packet network through ingress interfaces connected to the Layer-3 packet network;

processing respective Layer-3 headers of the packets received through the ingress interfaces and routing the packets via egress interfaces to respective destinations indicated by the Layer-3 headers;

identifying a flow of the received packets that is causing congestion in the network and a Layer-3 address from which the flow originates; and routing a backward congestion notification message (CNM) packet via one of the egress interfaces to the identified Layer-3 address, wherein receiving the packets comprises receiving the flows in a label edge router (LER) at an egress from a label-switched tunnel through the network, and wherein identifying the flow comprises receiving a forward explicit congestion notification (FECN) from a label-switched router (LSR) in the tunnel, and routing the backward CNM packet comprises directing the routing logic to route the backward CNM packet to the identified Layer-3 address from which the identified flow originates via a path that is independent of the tunnel.

* * * * *